United States Patent [19]

Wrülich et al.

[11] Patent Number: 4,577,892
[45] Date of Patent: Mar. 25, 1986

[54] ARRANGEMENT FOR SUPPLYING A PRESSURIZED LIQUID TO A ROTATING MACHINE PART

[75] Inventors: Herwig Wrülich, Zeltweg; Franz Schöffmann, Leoben; Wilfried Maier, Zeltweg, all of Austria

[73] Assignee: Voest-Alpine Aktiengesellschaft, Vienna, Austria

[21] Appl. No.: 529,743

[22] Filed: Sep. 6, 1983

[30] Foreign Application Priority Data

Sep. 9, 1982 [AT] Austria .................................. 3382/82

[51] Int. Cl.4 ............................................ F16L 39/00
[52] U.S. Cl. ...................................... 285/136; 285/190
[58] Field of Search ......................... 285/136, 134, 190

[56] References Cited

U.S. PATENT DOCUMENTS

| | | | |
|---|---|---|---|
| 2,187,147 | 1/1940 | Englesson | 285/136 |
| 2,225,547 | 12/1940 | Butler et al. | 285/136 |
| 2,586,617 | 2/1952 | Danly | 285/134 X |
| 2,831,710 | 4/1958 | Edmonson | 285/190 |
| 2,845,282 | 7/1958 | Mueller | 285/190 X |
| 3,210,099 | 10/1965 | Franck | 285/190 |
| 4,098,455 | 7/1978 | Ammann et al. | 285/190 X |
| 4,422,676 | 12/1983 | Sitabkhan | 285/190 X |

Primary Examiner—Richard J. Scanlan, Jr.
Attorney, Agent, or Firm—Cushman, Darby & Cushman

[57] ABSTRACT

For supplying a pressurized cooling liquid to the outlet openings in a cutting head, there is provided an axial supply bore (3) opening into a distributing chamber. Radial passages (11) are provided which open into the distributing chamber and lead to the outlet openings at the periphery of the rotating cutting head. The distributing chamber is designed as a space coaxially surrounding the axial bore (3), being closed at its front side and having its mantle stationary arranged. At least two radial bores (9, 10) of opposite radial direction adjoin this annular space and are displaced in axial direction of the bore (3). The cutting head is sealingly guided on the non-rotating mantle of the annular space.

8 Claims, 3 Drawing Figures

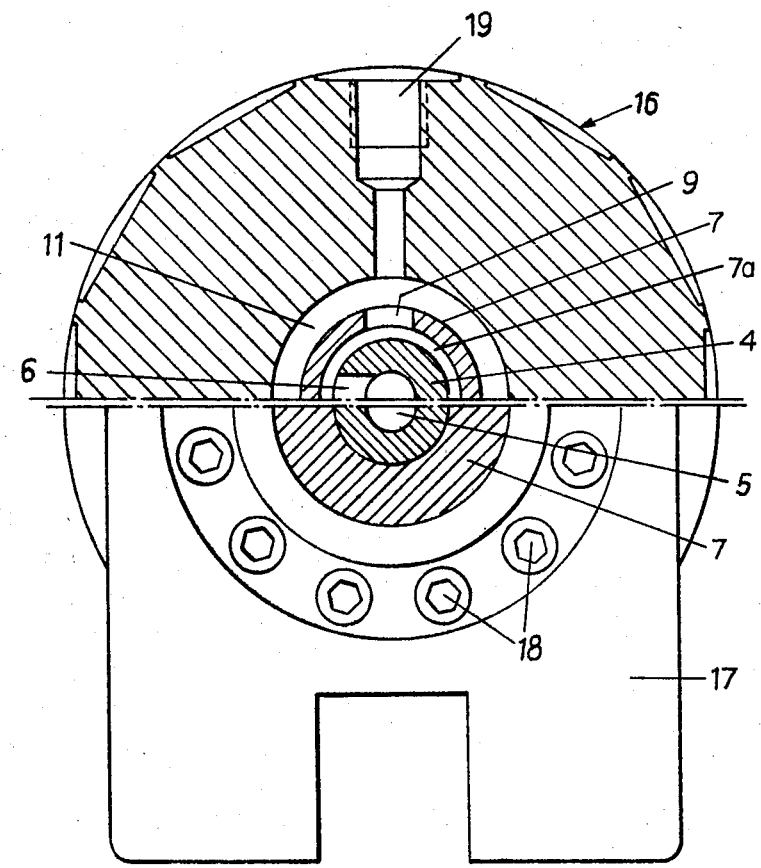

ARRANGEMENT FOR SUPPLYING A PRESSURIZED LIQUID TO A ROTATING MACHINE PART

The invention refers to an arrangement for supplying a pressurized liquid, in particular of cooling water, to a rotating machine part, in particular to a cutting head, in which arrangment the liquid is, via a stationary axial bore, supplied to a distributing chamber and is fed via radial passages opening into the distributing chamber to outlet openings provided on the periphery of the rotating machine part. It is, in particular with cutting heads, already known to provide within the interior of the cutting head passages leading to outlet nozzles serving the purpose of spraying cooling water onto the bits. With such cutting heads, the water is supplied via an axial tube connected to the cutting arm and opening into a distributing chamber rotating together with the cutting head. Such an embodiment can, for example, be derived from AT-PS 359 453. Radial passages and, with the known embodiment, axially extending annular spaces are connected to this distributing chamber for supplying the cooling water to the outlet nozzles. With this known construction it is disadvantageous that sealing problems arrise with high supply pressures and that it is not possible to separately supply in a simple manner the nozzles of individual sectors of the circumference of the cutting head. With high supply pressures there arise, beside the load on the sealing surfaces, a severe stress of the sealings as well as a high mechanical stress of the constructional parts for the water supply, in particular if individual sectors of the cutting head are supplied with spraying water and if water supply is shut off if the cutting head rotates.

The invention now aims at providing a constructionally simple arrangement for supplying water with high supply pressures and which allows a sector control for the supply of the presurized liquid with an only low constructional expense without endangering the tightness of the arrangement under the peak loads occurring with such a sector control. For solving this task, the invention essentially consists in that the distributing chamber is designed as a cylindrical annular space coaxially surrounding the axial bore and being closed at its front end and having its mantle stationarily arranged, in that at least two radial bores adjoin the annular space in an axial plane and are displaced in axial direction and are of opposite radial direction and in that the rotating machine part is sealingly guided on the non-rotating mantle of the annular space. In contrast to the known embodiment, the distributing chamber and also the axial supply means is stationary and the supply tube can even with high pressures more easily be sealed in such a constructional part forming the distributing chamber. On account of the circumstance that there adjoin to the annular space formed of a coaxial cylindrical mantle at least two radial bores of opposite radial direction and being located in at least one axial plane and this in a manner displaced in axial direction, the load on the supply tube can be made more uniform and further an arrangement can be realized in which the resulting hydrostatic pressure forces acting on the supply tube have no radial component or only very small radial components, so that the tight seat of the supply tube and the seal thereof relative to the annular space is not endangered. Now, bores of the rotating machine part adjoin the annular space in radial direction and come, in dependence on the design and the construction, in alignment with the radial bores of the cylindrical space over a whole revolution for 360° or over a partial area of this revolution. In this manner, supply of water to individual sectors of the circumferential surface or over the whole circumference of the cutting head can be realized without constructional difficulties.

The arrangement is, according to the invention, preferably such that the cylindrical annular space is limited by a bushing gripping over the supply tube having the axial bore, that the axial bore is designed as a blind bore and is opening into the annular space via at least one radial perforation and that the end portion, being closed at its front side, of the supply tube is sealingly arranged at the front side of the bushing. In view of the axial bore being designed as a blind bore and in view of this bore opening into the annular space with deflecting the supplied liquid via radial perforations, there results a further reduction of the load on the supply tube because the high pressure impulses occurring in a sector control are equalized with respect to the supply tube extending through the coaxial annular space by the multiple deflection of the liquid along the supply path, which again results in stress-relieving the sealing.

Preferably the arrangement is such that within one axial plane of the supply tube there are arranged within the bushing at least three radial perforations, one bore showing one radial direction being, as seen in axial direction of the supply tube, preferably arranged centrally between the bores showing in the other radial direction. By arranging one bore showing in one radial direction between the bores showing in the other radial direction, the pressure acting at both sides of the supply tube can further be equalized and greatly compensated, so that also by this measure the load on the supply tube, which load would have as a result a deviation of the supply tube from the axial direction, is kept low whereby the sealing effect is further improved with high supply pressures.

For supplying the supplied liquid from the annular space into the bores of the rotating machine part, the radial bores of the bushing preferably open into annular grooves extending over at least part of the circumference of the bushing. In dependence on the sector angle over which extend the annular grooves, this measure provides the possibility to realize either a continuous supply to the outlet nozzles on the periphery of the machine part or a sector control in which in case of a cutting head the cooling water emerges only in that area within which the bits are in engagement with the rock to be cut, noting that again for equalizing the occurring loads, the arrangement is preferably such that at least two radial perforations of the axial supply tube are displaced one relative to the other in axial direction of the supply tube and are preferably arranged within the same axial plane. In consideration of water supply pressures of, for example, more than 100 bar, the arrangement may in advantageous manner be such that the radial perforations of the bushing are desplaced relative to the radial perforations of the supply tube in circumferential direction and are preferably arranged in respectively different radial planes, so that, in particular with a sector control, the pressure load of the water supply arrangement is further equalized. In the same sense it is advantageous if the circumferential surfaces of the annular grooves connected to the bores, showing in one radial direction, of the bushing are equal to the circumferential surface or surfaces of the annular groove or grooves connected to the bore or bores, showing in the other radial direction, of the bushing, because in this case the hydrostatic pressure is maintained at substantially the same value at both sides of the supply tube.

For a sector control it is of advantage if the annular grooves of the bushing extend over a sector angle of 90° to 270°, preferably approximately 180°, noting that the radial bores of the bushing comprising annular grooves provides the possibility to switch on and switch off supply of water without hard pressure impulses. For this purpose it is sufficient if the annular grooves have a reduced width at their ends.

In the following, the invention is further illustrated with reference to an embodiment shown in the drawing.

In the drawing

FIG. 2 is a section along line II—II of FIG. 1 and

FIG. 3 is a view in direction of the arrow III of FIG. 1.

Figure 1:
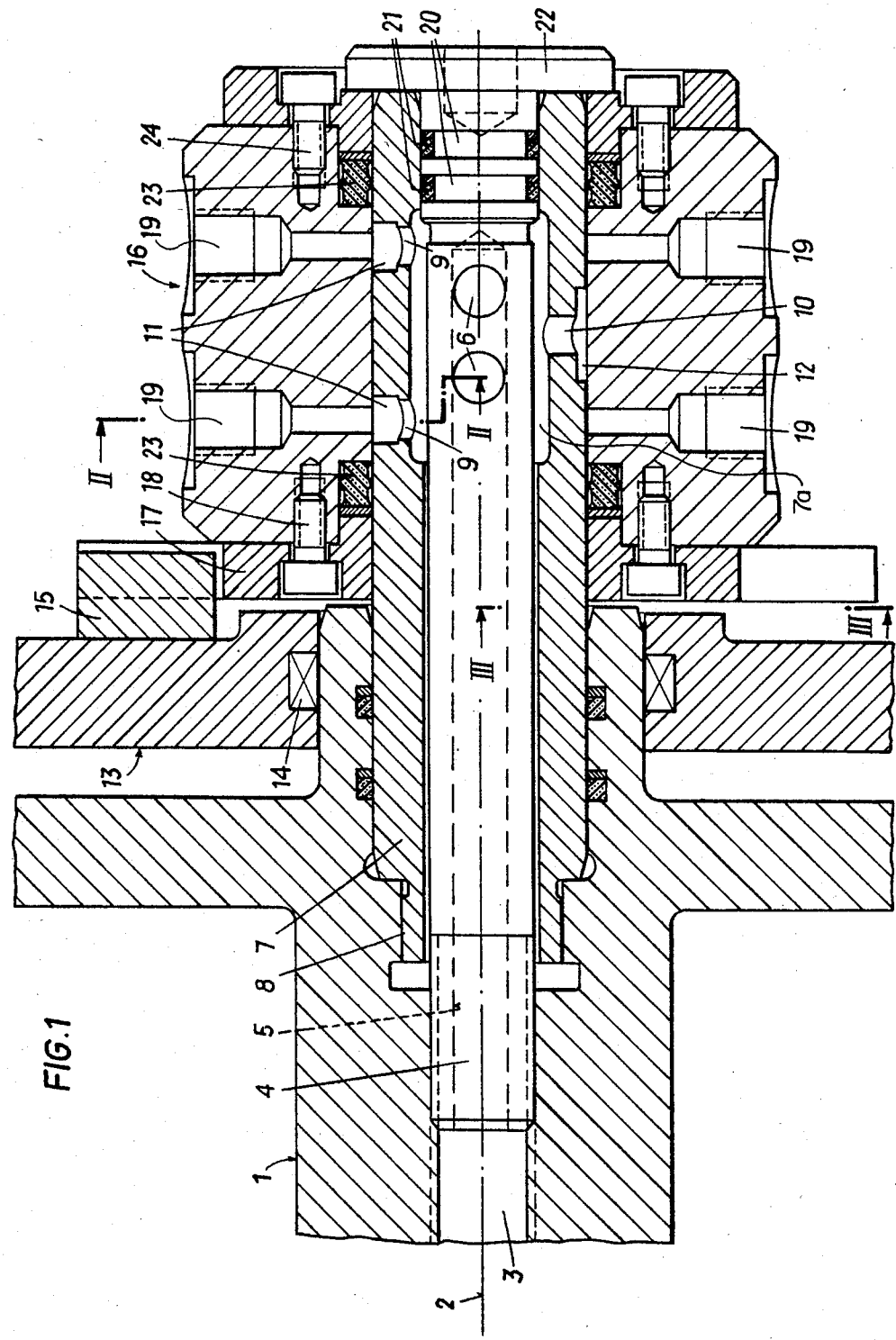
FIG. 1 is an axial section through the arrangement according to the invention.

In FIG. 1, there is provided a stationary part 1, which can, for example, be rigidly connected with a cutting arm not shown. Within this stationary part 1 there is provided a water supply means located in the rotational axis 2 of the rotating constructional part and comprising a water supply tube 4 screwed into a bore 3 of the stationary part 1. This water supply tube has an axially directed blind bore 5 to which are connected radially extending perforations 6. The water supply tube 4 is concentrically surrounded by a bushing 7 which is via a hexagon head 8 non-rotatably connected with the stationary part 1. An annular distribution chamber 7a is defined between the outer surface of the supply tube 4 and the inner surface of the bushing 7. The bushing has radial perforations 9 which show, within an axial plane shown in FIG. 1, in one and the same direction, and has a radial perforation 10 which shows, within the same axial plane, in the opposite direction. Annular grooves 11,12 are adjoined to the radial perforations 9 and, respectively, 10, noting that the arrangement is such that the sum of the circumferential surfaces of the annular grooves 11 is approximately equal the circumferential surface of the annular groove 12.

A constructional part 13 is rotatably supported on the stationary part 1, the bearings being designated 14. This rotating part 13 engages the rotating machine part 16 via claws 15, the constructional part carrying the counter-profile of the claw 15 being designated 17 and being connected with the rotating machine part 16 by means of screws 18 in a manner secured against rotation.

The rotating constructional part 16 is now provided with radial bores 19 which, on rotation of the machine part 16 around the axis 2, are over at least part of the circumference of the bushing 7 in alignment with the grooves 11.

At the front side, the arrangement is sealed in view of the fact that the supply tube 4 has annular grooves 20 for receiving sealing rings 21, the sealing rings 21 contacting the inner circumference of the bushing 7 within that end of the bushing 7 which is located adjacent to its front side. The tube 4 carries an enlarged head 22 which contacts the front side of the bushing after having screwed the tube 4 into the bore 3.

The rotating machine part, which can, for example, form part of a cutting head, contacts, with interposition of sealings 23, the outer side of the bushing 7, said sealings being maintained in position and subjected to compression force by means of the screws 18 and 24.

In the section according to FIG. 2 and in the view according to FIG. 3 the reference numerals of FIG. 1 are again used.

What is claimed is:

1. In a machine including a stationary part and a rotatable part: apparatus for supplying pressurized liquid from the stationary part to the rotating part, said apparatus comprising a liquid supply tube extending from said stationary part into said rotatable part, said supply tube having a closed end within said rotatable part; a non-rotatable bushing surrounding said liquid supply tube arranged in sealing relationship with said rotatable part, said bushing defining with said supply tube, at a location within said rotatable part, an annular distributing chamber, said supply tube having at least one radial bore opening into said annular distributing chamber, said bushing having at least two radial bores in communication with said distributing chamber, said radial bores in said bushing being axially spaced apart and extending in opposite radial directions, and said rotatable part having liquid passages extending between the periphery of said rotatable part and the locations of said radial bores in said bushing.

2. A machine as in claim 1 wherein, within one axial plane, said bushing has at least three radial bores, one of such bores being located between the other two bores and extending in a radial direction opposite to the radial direction of the other two bores.

3. A machine as in claim 1 wherein said bushing has annular grooves extending over at least a part of the circumference of said bushing, said radial bores in said bushing communicating with said grooves.

4. A machine as in claim 1 wherein said supply tube has at least two radial bores which are axially spaced apart.

5. A machine as in claim 4 wherein said two radial bores in said supply tube lie in a common axial plane.

6. A machine as in claim 1 wherein the radial bores in said bushing are circumferentially spaced apart relative to said bores in said supply tube.

7. A machine as in claim 3 wherein said annular grooves extend over a sector angle of 90° to 270°.

8. A machine as in claim 7 wherein said annular grooves extend over a sector angle of approximately 180°.

* * * * *